United States Patent
Kao et al.

(10) Patent No.: US 8,830,170 B2
(45) Date of Patent: Sep. 9, 2014

(54) OPTICAL POINTING SYSTEM AND RELATED METHOD

(75) Inventors: Ming-Tsan Kao, Hsin-Chu (TW);
Chao-Chien Huang, Hsin-Chu (TW);
Chia-Cheun Liang, Hsin-Chu (TW);
Yi-Hsien Ko, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 114 days.

(21) Appl. No.: 13/472,494

(22) Filed: May 16, 2012

(65) Prior Publication Data
US 2013/0050079 A1    Feb. 28, 2013

(30) Foreign Application Priority Data
Aug. 24, 2011    (TW) .............................. 100130334 A (51) Int. Cl.
*G09G 5/08*        (2006.01)
*G06F 3/03*        (2006.01)

(52) U.S. Cl.
CPC .................................... *G06F 3/0325* (2013.01)
USPC ............ 345/158; 345/156; 345/169; 348/734

(58) Field of Classification Search
USPC .......... 345/156–158, 169; 348/734; 178/41 R
See application file for complete search history.

(56) References Cited

U.S. PATENT DOCUMENTS

| | | | |
|---|---|---|---|
| 8,313,379 B2 * | 11/2012 | Ikeda et al. ..................... 463/38 |
| 8,345,002 B2 | 1/2013 | Lin | |
| 2006/0284841 A1 * | 12/2006 | Hong et al. ................... 345/157 |
| 2008/0180396 A1 * | 7/2008 | Lin et al. ...................... 345/158 |

FOREIGN PATENT DOCUMENTS

CN    101246642 A    8/2008

* cited by examiner

*Primary Examiner* — Jennifer Nguyen
(74) *Attorney, Agent, or Firm* — Winston Hsu; Scott Margo (57) ABSTRACT

An optical pointing system includes a plurality of light sources, an image receiver, and an analyzing unit. The plurality of light sources are disposed on multiple locations of an object and configured to provide light having distinct wavelengths. The image receiver is configured to detect optical signals of the plurality of light sources, thereby generating a plurality of corresponding images. The analyzing unit is configured to calculate a relative position or angle of the image receiver with respect to the object according to the images.

11 Claims, 8 Drawing Sheets

OPTICAL POINTING SYSTEM AND RELATED METHOD

BACKGROUND OF THE INVENTION

1. Field of the Invention

The present invention is related to an optical pointing system and a related method, and more particularly, to an optical pointing system and a related method which reduces background interferences.

2. Description of the Prior Art

A remote controller allows a user to control an electronic device anywhere within the communication range. A traditional remote controller normally includes a plurality of function-specific buttons for providing simple functions, such as power on/off, selecting/entering channel and adjusting settings. With rapid development of technology, interactive and versatile intelligent home applications have become more and more popular.

Intelligent home applications can be an optical pointing system which includes multiple electronic devices, such as TV, set-top box, multi-media player or Blu-ray player. A remote controller for use in intelligent home applications provides more functions than a traditional remote controller. For example, a directive interface may be provided for operating a browser installed in a set-top box, and an input interface may be provided for performing web search or inputting web addresses on a screen. For directive operations, the manipulation of a cursor on the screen may be influenced by how a user holds the remote controller. Therefore, it is necessary to provide an optical pointing system capable of determining the relative position and angle of an object electronic device and its control device accurately.

SUMMARY OF THE INVENTION

The present invention provides an optical pointing system including a first light source disposed on a first location of an object and configured to provide a first light whose wavelength is within a first predetermined range; a second light source disposed on a second location of the object and configured to provide a second light whose wavelength is within a second predetermined range; an image receiver configured to detect optical signals of the first light source and the second light source for generating a corresponding first image and a corresponding second image; and an analyzing unit configured to acquire a relative position of the image receiver with respect to the object according to the first image and the second image.

The present invention also provides a method of performing optical pointing including providing a first light whose wavelength is within a first predetermined range on a first location of an object; providing a second light whose wavelength is within a second predetermined range on a second location of the object; an image receiver detecting optical signals of the first light source and the second light for generating a corresponding first image and a corresponding second image; and acquiring a relative position of the image receiver with respect to the object according to the first image and the second image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
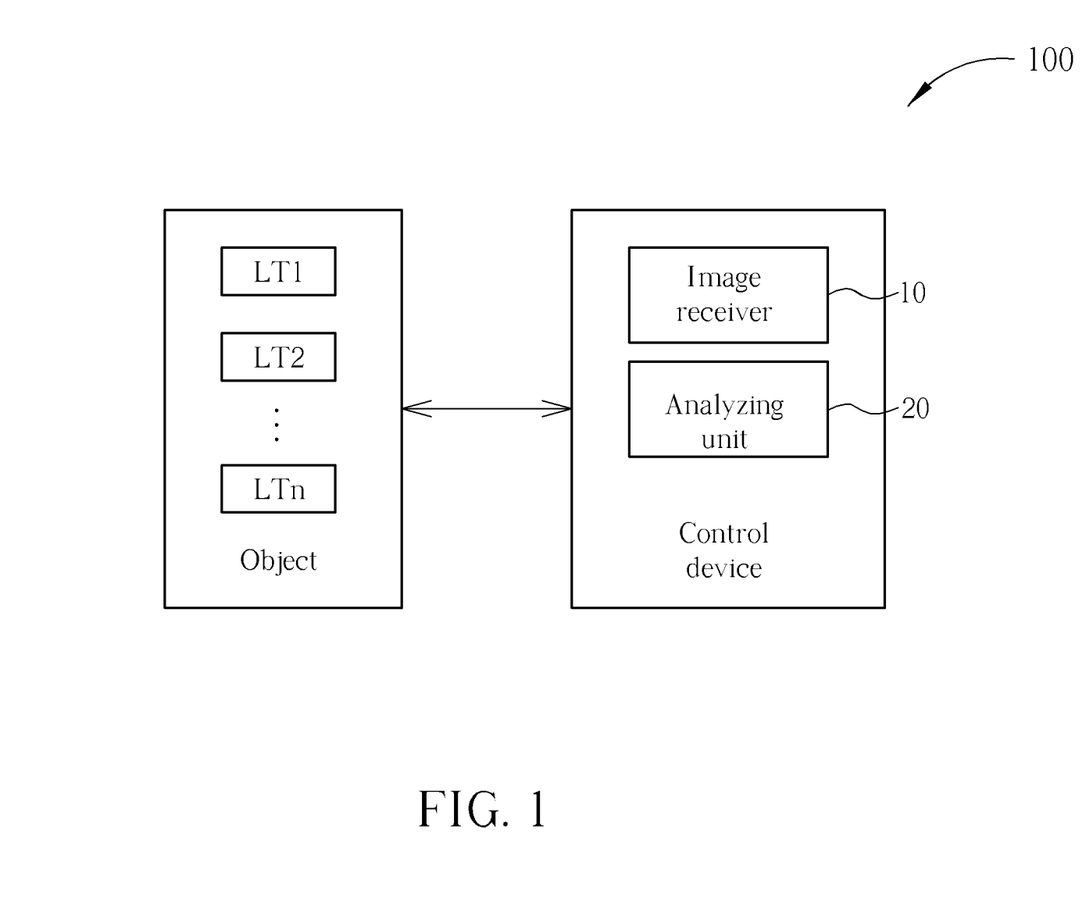
FIGS. 1-3 are functional diagrams illustrating an optical pointing system according embodiments of the present invention.

FIG. 1 is a functional diagram illustrating an optical pointing system 100 according to a first embodiment of the present invention. The optical pointing system 100 includes a plurality of light sources LT1-LTn (n is an integer larger than 1), an image receiver 10, and an analyzing unit 20. The light sources LT1-LTn may be disposed on an object, such as on the front housing of a display device. The image receiver 10 and the analyzing unit 20 may be disposed in a control device of the object, such as in a remote controller of the display device. Each of the light sources LT1-LTn may be a visible light source having a specific color or an infrared light source having a specific frequency. Therefore, the light sources LT1-LTn may provide lights whose wavelengths are within $1^{st}$-$n^{th}$ predetermined ranges, respectively. In the optical pointing system 100 according to the first embodiment of the present invention, the image receiver 10 is configured to detect the optical signals of the light sources LT1-LTn for generating corresponding images.

Figure 2:
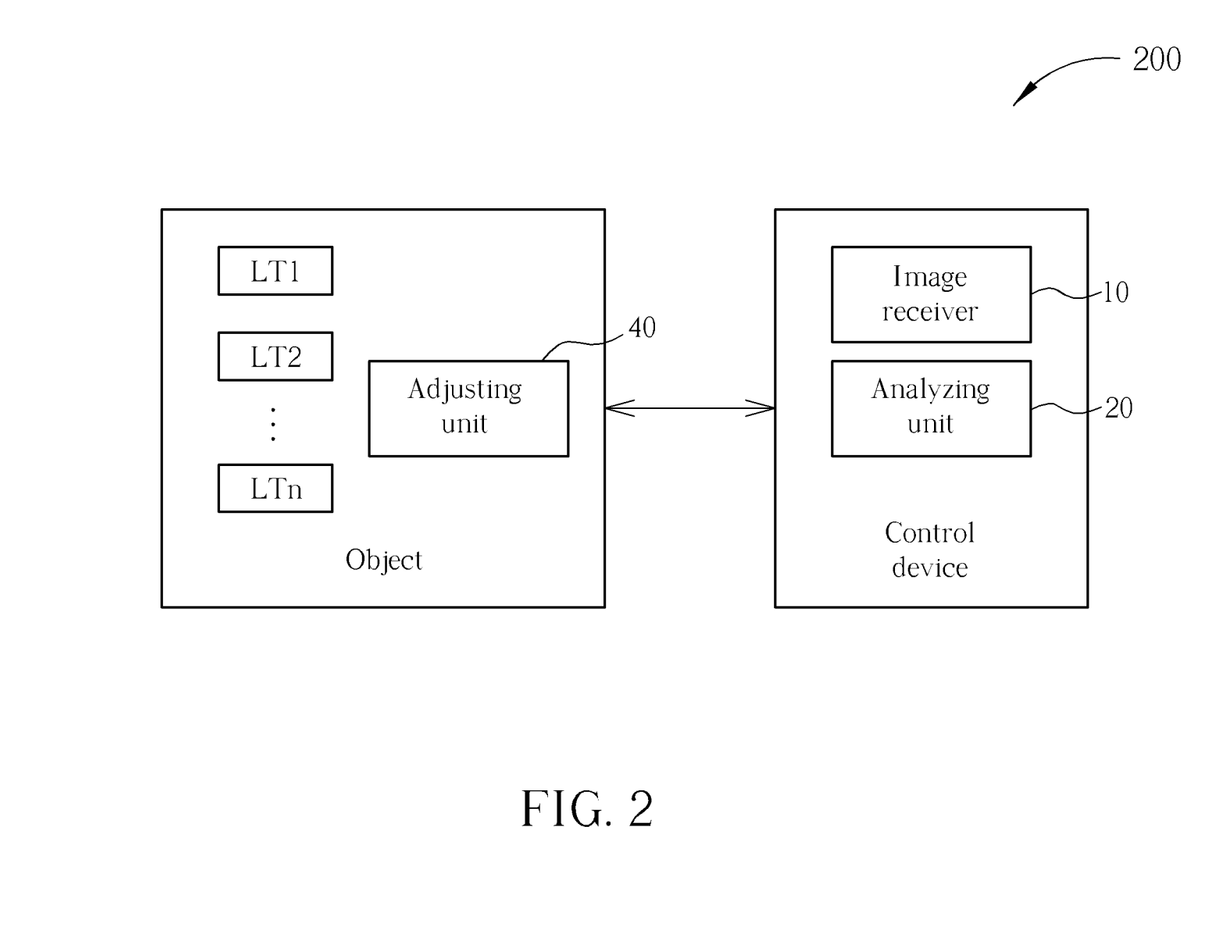

FIG. 2 is a functional diagram illustrating an optical pointing system 200 according to a second embodiment of the present invention. The optical pointing system 200 includes a plurality of light sources LT1-LTn, an image receiver 10, an analyzing unit 20, and an adjusting unit 40. The light sources LT1-LTn and the adjusting unit 40 may be disposed on an object, such as on the front housing of a display device. The image receiver 10 and the analyzing unit 20 may be disposed in a control device of the object, such as in a remote controller of the display device. Each of the light sources LT1-LTn may be a visible light source having a specific color or an infrared light source having a specific frequency. Therefore, the light sources LT1-LTn may provide lights whose wavelengths are within $1^{st}$-$n^{th}$ predetermined ranges, respectively. In the optical pointing system 200 according to the second embodiment of the present invention, the image receiver 10 is configured to detect the optical signals of the light sources LT1-LTn for generating corresponding images, as well as configured to detect a background optical signal. The analyzing unit 20 (or the image receiver 40 itself) may thus acquire the lighting period of the background optical signal, based on which the adjusting unit 40 is configured to adjust the lighting periods of the light sources LT1-LTn for reducing interference caused by the background optical signal.

Figure 3:
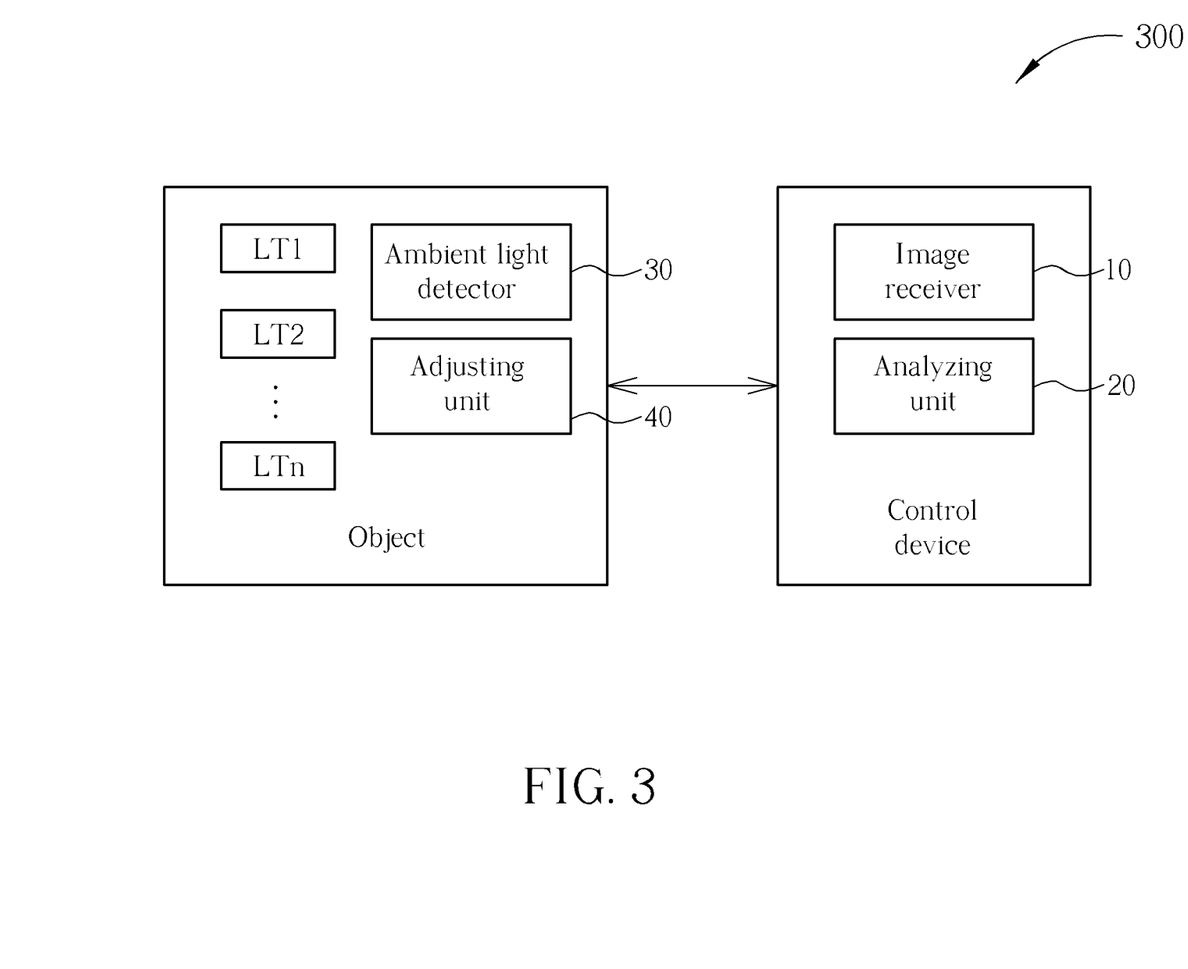

FIG. 3 is a functional diagram illustrating an optical pointing system 300 according to a third embodiment of the present invention. The optical pointing system 300 includes a plurality of light sources LT1-LTn, an image receiver 10, an analyzing unit 20, an ambient light detector 30, and an adjusting unit 40. The light sources LT1-LTn, the ambient light detector 30 and the adjusting unit 40 may be disposed on an object, such as on the front housing of a display device. The image receiver 10 and the analyzing unit 20 may be disposed in a control device of the object, such as in a remote controller of the display device. Each of the light sources LT1-LTn may be a visible light source having a specific color or an infrared light source having a specific frequency. Therefore, the light sources LT1-LTn may provide lights whose wavelengths are within $1^{st}$-$n^{th}$ predetermined ranges, respectively. In the optical pointing system 300 according to the third embodiment of the present invention, the image receiver 10 is configured to detect the optical signals of the light sources LT1-LTn for generating corresponding images. The ambient light detector 30 is configured to detect a background optical signal and acquire the lighting period of the background optical signal, based on which the adjusting unit 40 is configured to adjust the lighting periods of the light sources LT1-LTn for reducing interference caused by the background optical signal.

Figure 4:
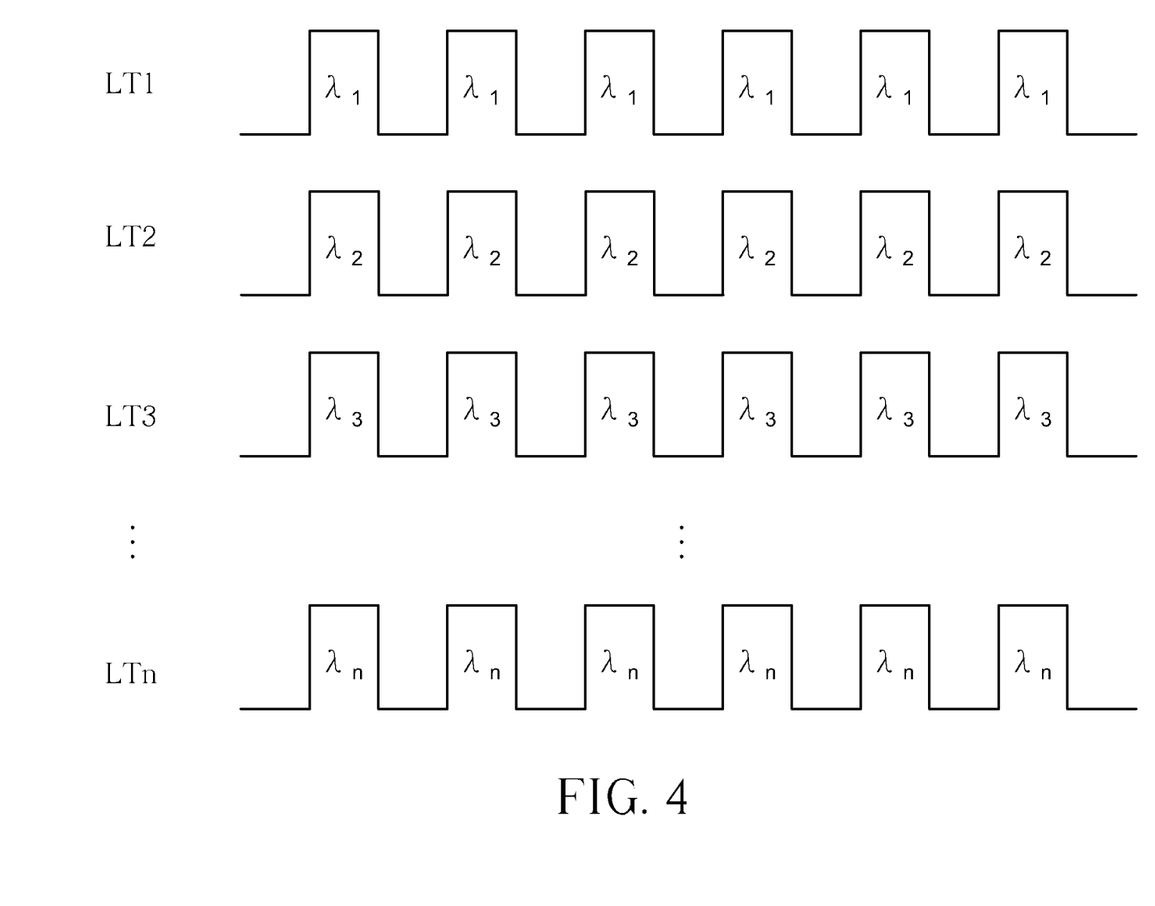
FIGS. 4 and 5 are signal diagrams illustrating the operation of an optical pointing system according to the present invention.

FIG. 4 is a signal diagram of the light sources LT1-LTn illustrating the operation of the optical pointing system 100 according to the first embodiment of the present invention. In the embodiment depicted in FIG. 4, the $1^{st}$-$n^{th}$ predetermined ranges are not overlapped with each other, or two adjacent predetermined ranges are only slightly overlapped. In other words, each of the $1^{st}$-$n^{th}$ predetermined ranges may be distinguishable by its wavelength characteristic. For example, the light sources LT1-LTn may provide lights having wavelengths $\lambda_1$-$\lambda_n$ ($\lambda_1 \neq \lambda_2 \neq \ldots \neq \lambda_n$), respectively. Therefore, the image receiver 10 may detect the optical signals of the light sources LT1-LTn for generating corresponding $1^{st}$-$n^{th}$ images. Since the $1^{st}$-$n^{th}$ images have different characteristics due to different wavelengths $\lambda_1$-$\lambda_n$, the analyzing unit 20 may acquire a relative position and/or a relative angle of the control device with respect to the object accordingly.

Figure 5:
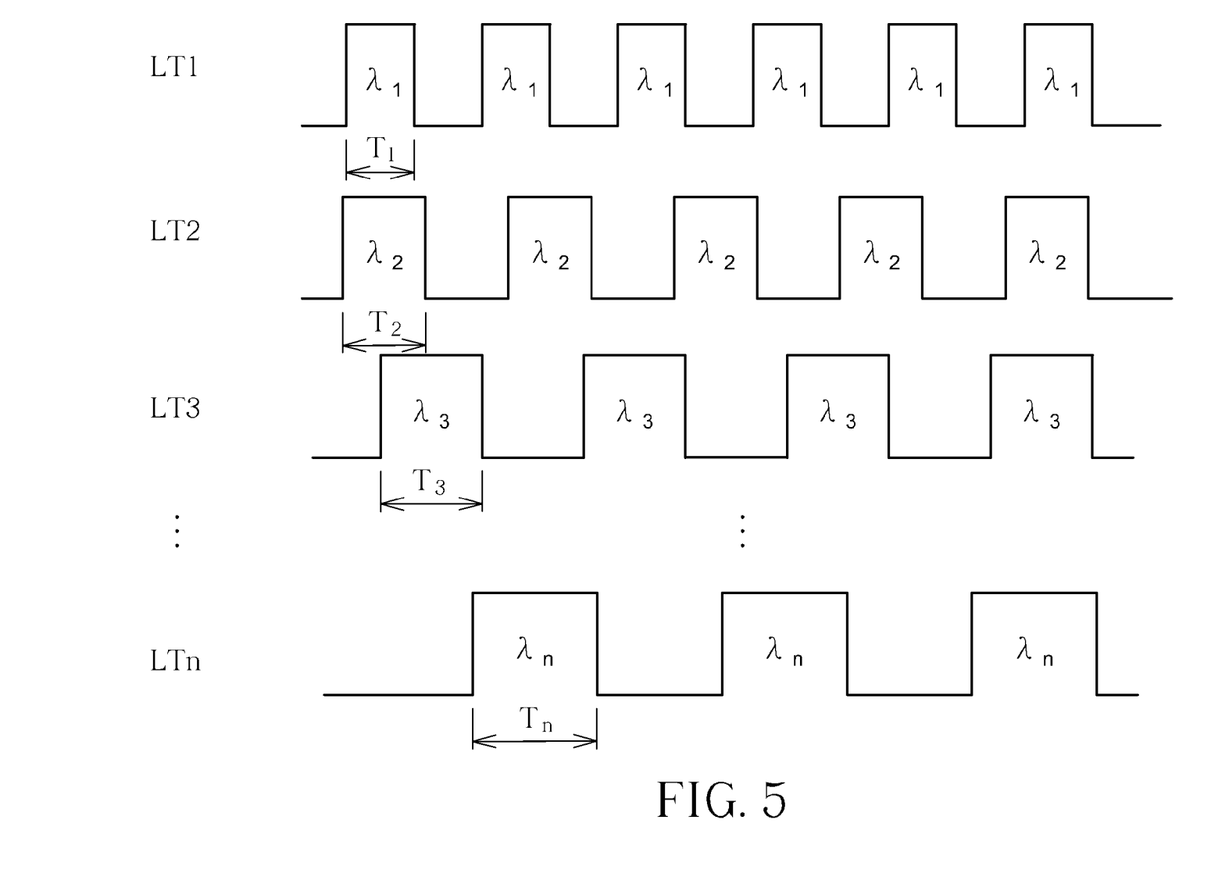

FIG. 5 is a signal diagram of the light sources LT1-LTn illustrating the operation of the optical pointing system 200 or 300. In the embodiment depicted in FIG. 5, the $1^{st}$-$n^{th}$ predetermined ranges are not overlapped with each other, or two adjacent predetermined ranges are only slightly overlapped. In other words, each of the $1^{st}$-$n^{th}$ predetermined ranges may be distinguishable by its wavelength characteristic. For example, the light sources LT1-LTn may provide lights having wavelengths $\lambda_1$-$\lambda_n$ ($\lambda_1 \neq \lambda_2 \neq \ldots \neq \lambda_n$), respectively. Meanwhile, the image receiver 10 or the ambient light detector 30 may acquire lighting periods $T_1$-$T_n$ of the light sources LT1-LTn according to the detected background optical signal. Therefore, the image receiver 10 may detect the optical signals of the light sources LT1-LTn for generating corresponding $1^{st}$-$n^{th}$ images. Since the $1^{st}$-$n^{th}$ images have different characteristics due to different wavelengths $\lambda_1$-$\lambda_n$, the analyzing unit 20 may acquire a relative position or a relative angle of the control device with respect to the object accordingly. Since the lighting periods $T_1$-$T_n$ are determined according to the background optical signal, the interference caused by the background optical signal may be reduced so that the analyzing unit 20 may acquire accurate results.

In an embodiment of the present invention, the lengths of the lighting periods $T_1$-$T_n$ may have the same value, or each may be an integral multiple of the smallest lighting period. In another embodiment of the present invention, the lengths of the lighting periods $T_1$-$T_n$ may have different values.

Figure 6:
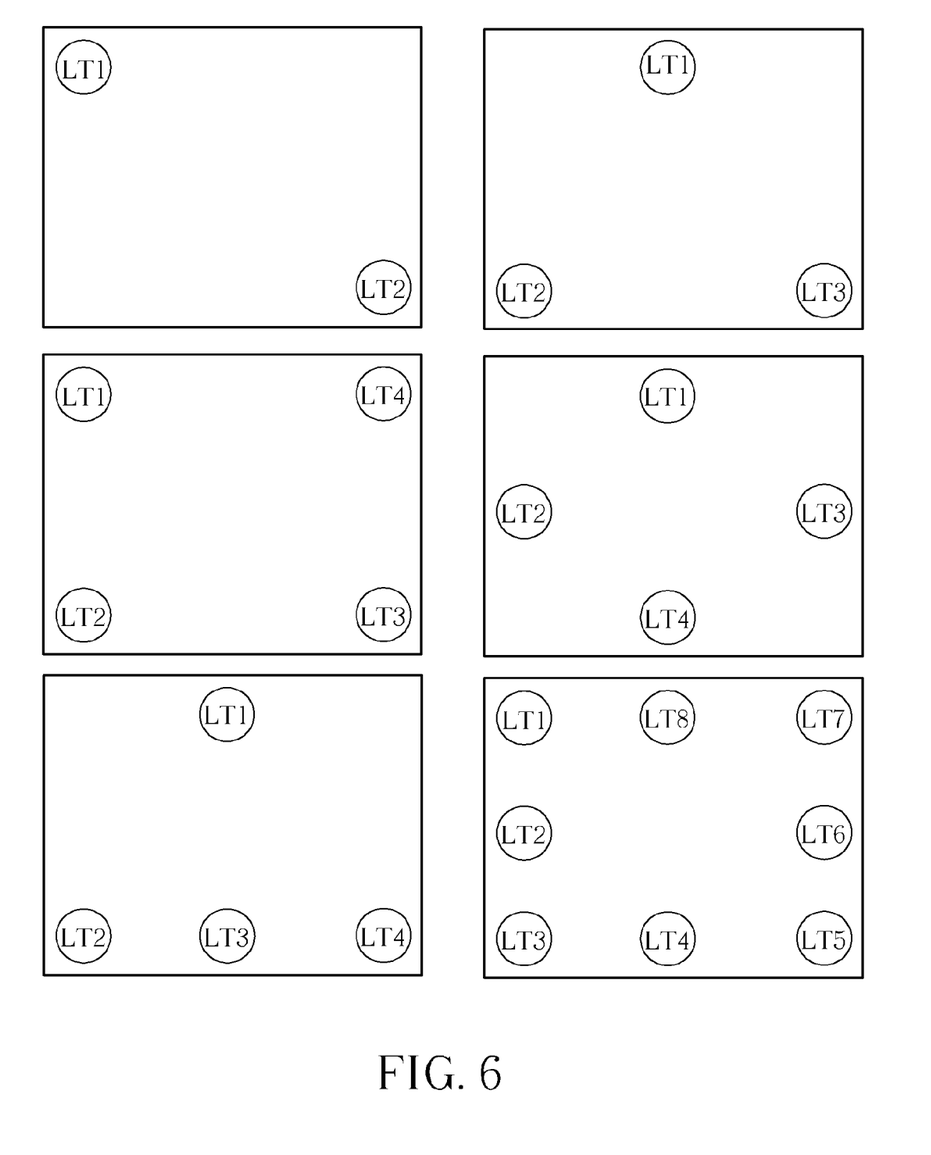
FIG. 6 is a diagram illustrating the arrangement of light sources in an optical pointing system according to the present invention.

FIG. 6 is a diagram illustrating the arrangement of the light sources LT1-LTn in the optical pointing system 100, 200 and 300. The light sources LT1-LTn may be disposed on different locations of the object. The value of n and the relative positions between each light source may vary according to the design and application of the object. The embodiment depicted in FIG. 6 is only for illustrative purpose and does not limit the scope of the present invention.

Figure 7:
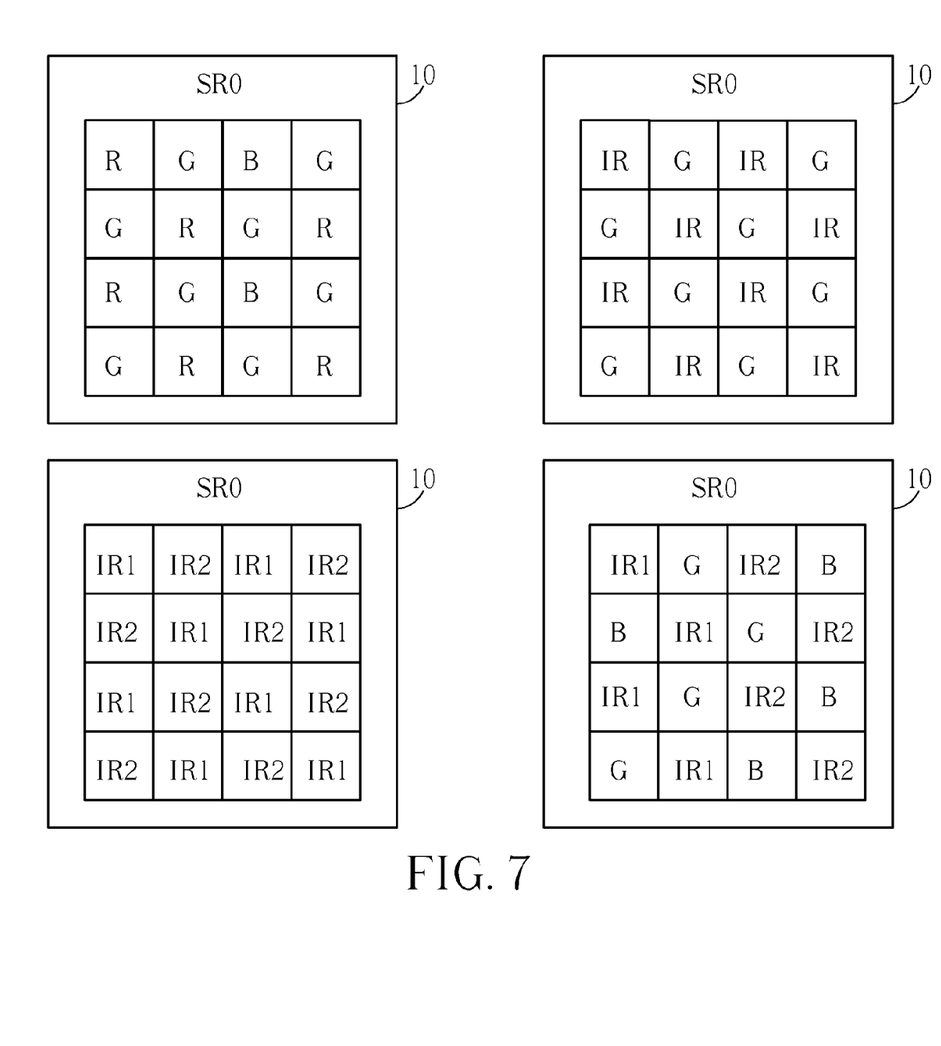
FIGS. 7 and 8 are diagrams illustrating an image receiver in an optical pointing system according to the present invention.
Figure 8:
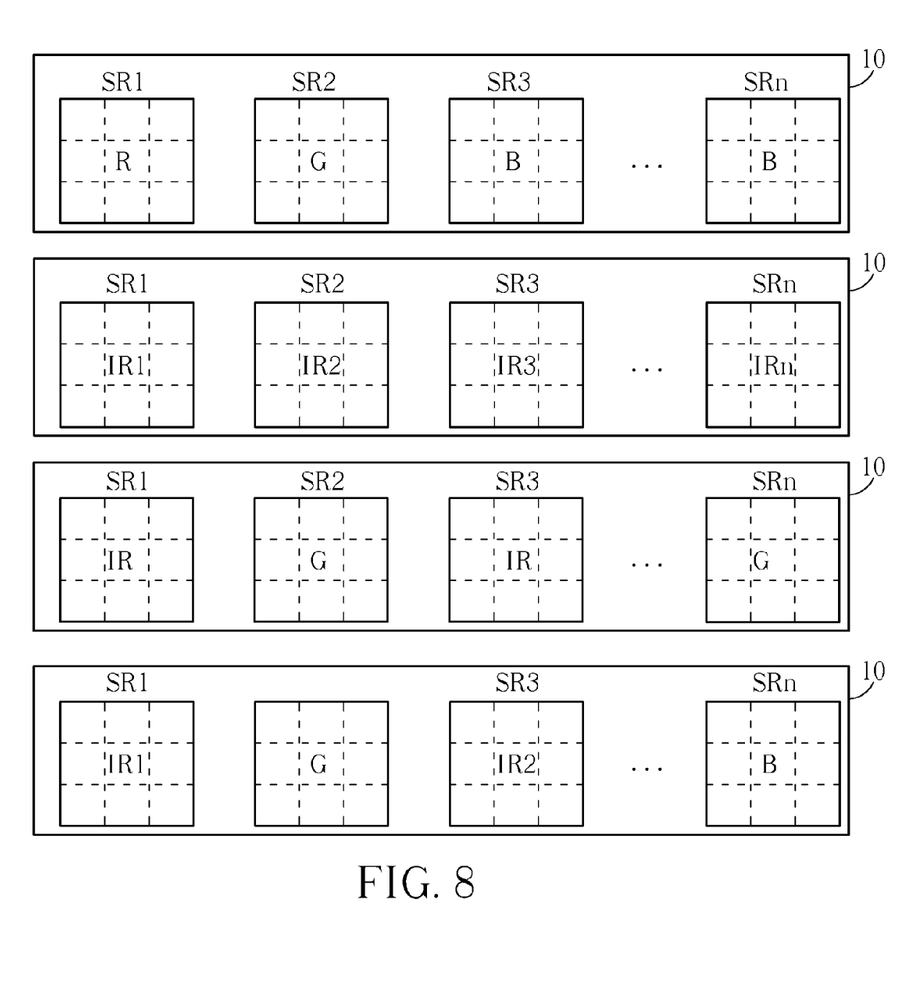

FIGS. 7 and 8 are diagrams illustrating the image receiver 10 in the optical pointing system 100, 200 and 300. In the embodiment depicted in FIG. 7, the image receiver 10 may include a single optical detector SR0 having a plurality of pixels. Each pixel may be covered by different types and/or amounts of optical coatings for blocking light whose wavelength is not within the corresponding predetermined range, thereby functioning as a filter. In FIG. 7, R, G, B, IR, IR1 and IR2 represent different types of optical coatings: a pixel covered by an optical coating R only allows red visible light (wavelength approximately between 600-780 nm) to pass, a pixel covered by an optical coating G only allows green visible light (wavelength approximately between 500-600 nm) to pass, a pixel covered by an optical coating B only allows blue visible light (wavelength approximately between 380-500 nm) to pass, and pixels covered by optical coatings IR, IR1 and IR2 only allow infrared light having specific wavelengths (approximately between 780-1400 nm) to pass.

In the embodiment depicted in FIG. 8, the image receiver 10 may include a plurality of optical detectors SR1-SRn each having a plurality of pixels. Pixels of different optical detectors SR1-SRn may be covered by different types and/or amounts of optical coatings for blocking light whose wavelength is not within the corresponding predetermined range, thereby functioning as a filter. In FIG. 8, R, G, B, IR and IR1-IRn represent different types of optical coatings: a pixel covered by an optical coating R only allows red visible light (wavelength approximately between 600-780 nm) to pass, a pixel covered by an optical coating G only allows green visible light (wavelength approximately between 500-600 nm) to pass, a pixel covered by an optical coating B only allows blue visible light (wavelength approximately between 380-500 nm) to pass, and pixels covered by optical coatings IR and IR1-IRn only allow infrared light having specific wavelengths (approximately between 780-1400 nm) to pass.

The image receiver 10 may adopt a single or multiple optical detectors according to the design and application. The types and amounts of optical coatings may be determined according to the types and amounts of the light sources LT1-LTn. The pixel arrangement of the filter may also vary when required. The embodiments depicted in FIGS. 7 and 8 are only for illustrative purpose and do not limit the scope of the present invention.

In the optical pointing system according to the present invention, a plurality of light sources whose wavelengths are within respective predetermined ranges may be disposed on different locations of an object. The lighting periods of the light sources may be adjusted for reducing interferences caused by background light sources. Therefore, the relative position and angle of the electronic device and its control device may be acquired accurately. Accurate directive commands may be issued regardless of how the user holds the control device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical pointing system, comprising:
   a first light source disposed on a first location of an object and configured to provide a first light whose wavelength is within a first predetermined range;
   a second light source disposed on a second location of the object and configured to provide a second light whose wavelength is within a second predetermined range different from the first predetermined range;

an image receiver comprising:
- a first optical detector configured to detect optical signals of the first light source for generating a corresponding first image, the first optical detector including at least one pixel covered by a first optical coating for blocking light whose wavelength is not within the first predetermined range; and
- a second optical detector configured to detect optical signals of the second light source for generating a corresponding second image, the second optical detector including at least one pixel covered by a second optical coating for blocking light whose wavelength is not within the second predetermined range; and an analyzing unit configured to acquire a relative position of the image receiver with respect to the object according to at least the first image and the second image.

2. The optical pointing system of claim 1, further comprising:
an adjusting unit configured to adjust a first lighting period of the first light source and a second lighting period of the second light source.

3. The optical pointing system of claim 2, further comprising:
an ambient light detector configured to detect a background optical signal of the optical pointing system in operation and acquire the first and second lighting periods according to the background optical signal.

4. The optical pointing system of claim 2, wherein the image receiver is further configured to detect a background optical signal of the optical pointing system in operation and acquire the first and second lighting periods according to the background optical signal.

5. The optical pointing system of claim 1, wherein each of the first light source and the second light source is a visible light sources having a specific color or an infrared light source having a specific frequency.

6. The optical pointing system of claim 1, further comprising:
a third light source disposed on a third location of the object and configured to provide a third light whose wavelength is within a third predetermined range different from the first predetermined range or the second predetermined range, wherein:
the image receiver further comprises a third optical detector configured to detect optical signals of the third light source for generating a corresponding third image, the third optical detector including at least one pixel covered by a third optical coating for blocking light whose wavelength is not within the third predetermined range; and
the analyzing unit is further configured to acquire the relative position of the image receiver with respect to the object according to the first image, the second image and the third image.

7. A method of performing optical pointing, comprising:
providing a first light whose wavelength is within a first predetermined range on a first location of an object;
providing a second light whose wavelength is within a second predetermined range different from the first predetermined range on a second location of the object;
a first optical detector of an image receiver detecting optical signals of the first light and blocking light whose wavelength is not within the first predetermined range for generating a corresponding first image;
a second optical detector of the image receiver detecting optical signals of the second light and blocking light whose wavelength is not within the second predetermined range for generating a corresponding second image; and
acquiring a relative position of the image receiver with respect to the object according to at least the first image and the second image.

8. The method of claim 7, further comprising:
providing the first light having a first lighting period on the first location of the object; and
providing the second light having a second lighting period on the second location of the object.

9. The method of claim 7, further comprising:
detecting a background optical signal; and
acquiring the first lighting period and the second lighting period according to the background optical signal.

10. The method of claim 9, wherein the first lighting period and the second lighting period are different from a lighting period of the background optical signal.

11. The method of claim 7, further comprising:
providing a third light whose wavelength is within a third predetermined range different from the first predetermined range or the second predetermined range on a third location of the object;
a third optical detector of the image receiver detecting optical signals of the third light and blocking light whose wavelength is not within the third predetermined range for generating a corresponding third image; and
acquiring the relative position of the image receiver with respect to the object according to the first image, the second image and the third image.

* * * * *